United States Patent
DeSalvo et al.

(10) Patent No.: US 9,223,494 B1
(45) Date of Patent: Dec. 29, 2015

(54) USER INTERFACES FOR WEARABLE COMPUTERS

(75) Inventors: Christopher D. DeSalvo, Marion, IA (US); Karl M. Becker, Cedar Rapids, IA (US); John T. Kelly, Murrieta, CA (US); Steven E. Koenck, Cedar Rapids, IA (US); David W. Jensen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 54 days.

(21) Appl. No.: 13/560,926

(22) Filed: Jul. 27, 2012

(51) Int. Cl.
*G06F 3/041* (2006.01)
*G06F 3/0488* (2013.01)

(52) U.S. Cl.
CPC .......... *G06F 3/0488* (2013.01); *G06F 3/04883* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 6,899,539 B1 * | 5/2005 | Stallman et al. | 434/11 |
| 8,407,623 B2 * | 3/2013 | Kerr et al. | 715/851 |
| 8,605,036 B1 * | 12/2013 | Kelly | 345/169 |
| 2005/0216867 A1 * | 9/2005 | Marvit et al. | 715/863 |
| 2006/0010400 A1 * | 1/2006 | Dehlin et al. | 715/856 |
| 2006/0238522 A1 * | 10/2006 | Westerman et al. | 345/173 |
| 2009/0088204 A1 * | 4/2009 | Culbert et al. | 455/556.1 |
| 2009/0100384 A1 * | 4/2009 | Louch | 715/863 |
| 2009/0166098 A1 * | 7/2009 | Sunder | 178/18.04 |
| 2010/0058251 A1 * | 3/2010 | Rottler et al. | 715/863 |
| 2012/0019522 A1 * | 1/2012 | Lawrence et al. | 345/419 |
| 2012/0130753 A1 * | 5/2012 | Lewis | 705/4 |
| 2012/0258681 A1 * | 10/2012 | Hanover | 455/404.2 |
| 2012/0282886 A1 * | 11/2012 | Amis | 455/404.2 |
| 2013/0104090 A1 * | 4/2013 | Yu et al. | 715/863 |
| 2013/0254711 A1 * | 9/2013 | Sievert et al. | 715/810 |
| 2013/0298080 A1 * | 11/2013 | Griffin et al. | 715/834 |
| 2014/0063055 A1 * | 3/2014 | Osterhout et al. | 345/633 |

* cited by examiner

*Primary Examiner* — Srilakshmi K Kumar
*Assistant Examiner* — Stephen T Reed
(74) *Attorney, Agent, or Firm* — Angel N. Gerdzhikov; Donna P. Suchy; Daniel M. Barbieri (57) ABSTRACT

A method for operating a wearable computer using a user interface system having a touch pad includes changing the behavior of the wearable computer in direct response to gestures received at the touch pad. The gestures are not used for graphical user interface selections and are not used for cursor operations but rather directly invoke communication, navigation, machinery operation, or other primary device features or operations.

21 Claims, 6 Drawing Sheets

USER INTERFACES FOR WEARABLE COMPUTERS

BACKGROUND

Soldiers on the ground, in land vehicles, or in aircraft often have primary tasks (e.g., conducting a mission, driving, flying, etc.) that do not include operating a personal computer. However, it has become more important for personal computers to be used by soldiers, drivers, pilots, first responders, police officers, and others for mission-based communication, navigation, status checking, or other primary task support activities. Conventional mouse and keyboard user inputs can be a hindrance to a soldier's performance in the field. Systems and methods for allowing a soldier to utilize a personal computing devices while maintaining focus on the soldier's (or other user's) primary task are needed.

It is challenging and difficult to design and implement user interfaces for soldiers. Challenges include: (a) the intended environment for use is often harsh, (b) at least one of the soldier's hands are often full (e.g., with a weapon), (c) the soldier may be wearing gloves, (d) cables and wires are difficult to use in active environments, (e) size, weight and power consumption are all parameters that should be relatively low, and (f) the soldier may not be able to view the user interface due to an emergent event or situation.

While some of the embodiments described herein relate to wearable computers for soldiers, other embodiments of the present application relate to user interfaces for other types of wearable computers or interfaces (e.g., for first responders, for pilots, for firefighters, for police, etc.).

SUMMARY

One embodiment of the invention relates to a user interface device. The user interface device includes a touch pad and a wireless transceiver coupled to the touch pad. The wireless transceiver is configured to send commands to a controlled device. The user interface device further includes circuitry for interpreting touch pad gestures as at least one of communication and navigation commands for the controlled device. In some embodiments, the commands are not cursor commands or graphical user interface selection commands. In some embodiments, the touch pad gestures may be used for data entry (e.g., text entry) as well as the entry of commands.

Some embodiments of the present invention relate to a method for operating a wearable computer using a user interface system having a touch pad. The method includes changing the behavior of the wearable computer in direct response to gestures received at the touch pad. The gestures are not used for graphical user interface selections and are not used for cursor operations but rather directly invoke communication, navigation, machinery operation, or other primary device features or operations.

Some embodiments of the present invention relate to a method for operating a wearable computer using a user interface system having a touch pad. The method includes receiving signals from the touch pad and recognizing the received touch pad signals as a gesture. The method further includes executing an operation relative to a menu for the wearable computer in response to the recognized gesture. The method also includes outputting feedback in response to the executed operation. In some embodiments, the touch pad gestures may be used for data entry (e.g., text entry) as well as the entry of commands.

Other embodiments of the present invention relate to a user interface system for a wearable computer. The user interface system includes a touch pad and non-transient computer readable media on the touch pad or on the wearable computer. The non-transient computer readable media stores (a) a hierarchy of gestures corresponding with a hierarchical menu of options for the wearable computer, and (b) executable computer code for interpreting signals received from the touch pad as input gestures and for causing the navigation through the hierarchical menu of options for the wearable computer by comparing the input gestures to the hierarchy of gestures. The user interface system, in some embodiments, do not allow cursor-based input or graphical user interface selections to the wearable computer using the touch pad. In other embodiments, the user interface system can be used to conduct rapid eyes-free interaction with a wearable computer but also includes a mode where the touch sensitive controller can be used for cursor inputs.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

The present application generally relates to user interfaces for wearable computers. Many embodiments of the present disclosure relate to user interfaces for wearable computers that include a touch pad and a wearable computer core that pair touch pad gestures with menu operations, information retrieval tasks, data entries, and other user inputs. The touch pad may be worn on the body or carried on another device (e.g., a weapon). A touch pad that is worn or carried may provide advantages such as no-look use and isolation from vibration between the user and the environment (e.g., the body and clothing may damp vibrations and shocks from walking or traveling in a vehicle).

Figure 1:
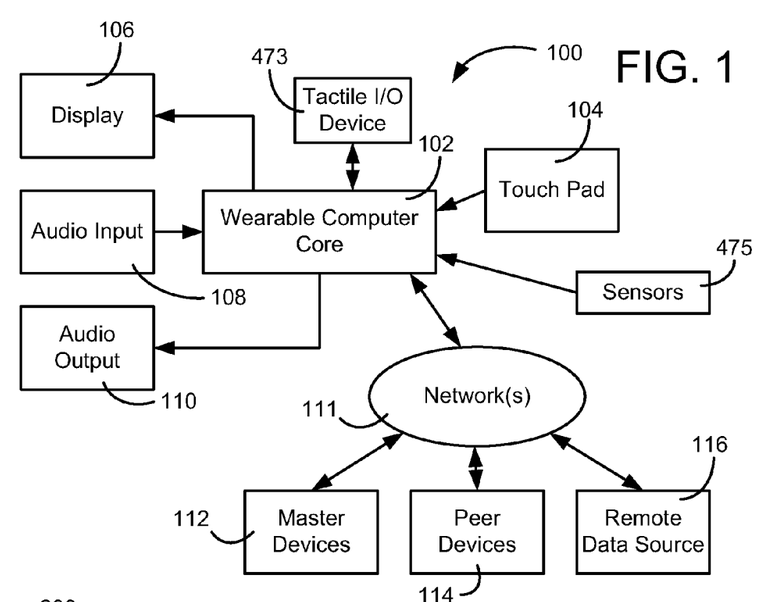
FIG. 1 is a block diagram of a user interface system, according to an exemplary embodiment.

Referring now to FIG. 1, a block diagram of a user interface system 100 is shown, according to an exemplary embodiment. User interface system 100 includes a wearable computer core 102 and a touch pad 104. Wearable computer core 102 may be where the primary processor and input/output handling capability of system 100 resides. For example, inputs received from touch pad 104 at wearable computer core 102 may be processed by wearable computer core 102 for action (e.g., to recall information, to conduct a communications task, etc.). Wearable computer core 102 may be configured to change behavior in direct response to gestures received at touch pad 104. For example, rather than touch pad 104 causing wearable computer 102 to move a cursor on a screen or for icon selections via, e.g., tap inputs, a first gesture may directly associate with a command for wearable computer core 102. For example, a circular motion on touch pad 104 with one finger may cause wearable computer core 102 to enter a sensing mode for evaluating the surrounding environment and to report the resulting evaluation via an audio earpiece (which may be audio output device 110).

By way of another example, a gesture swipe "up" may be used to cause the wearable computer to respond to a recent query for "In Position and Ready?" in the affirmative. A gesture swipe "down," on the other hand, may be directly interpreted by the wearable computer to cause the wearable computer to respond in the negative. Advantageously, a soldier operator may be able to conduct these acknowledgements without maintaining a visual line-of-sight with team members, without making any noise, and without taking his or her eyes off key mission objectives. Prior art communication systems include radio systems where vocal or audible exchanges are necessary. Prior art communication systems also include more traditional personal digital assistant or mobile phone devices wherein the user must maintain his or her eyes on the device to navigate a cursor, icon, or to make visual selections.

Referring still to FIG. 1, wearable computer core 102 is shown as communicably connected to display 106. Display 106 may be an OLED, LCD, or another type of display carried by the user. Display 106 may be a helmet-mounted display (e.g., head medium display, head-up display, etc.), a display on glasses (e.g., GOOGLE GOGGLES, a display on or within night vision goggles, a weapon-mounted display, or a vehicle mounted display. In some embodiments, display 106 may be paired and connected via a wireless (e.g., BLUETOOTH) protocol such that a display 106 can be paired when needed and unpaired or disconnected when not needed. Advantageously, such a system may allow a soldier operator to lighten his or her load and to avoid carrying a display for the wearable computer. Display 106 may be integrated with touch pad 104, or may be connected to touch pad 104.

In embodiments where display 106 takes the form of glasses, goggles, a HUD, or another display type that is substantially a see-through display, a touch pad of the present invention may be used for cursor navigation or data entry tasks. In such embodiments, acknowledgements may primarily be visual rather than audio or another type of output.

In other embodiments, display 106 may be wired to wearable computer core 102 or physically integrated with wearable computer core 102. For example, wearable computer core 102 may be a personal digital assistant, personal communicator, mobile phone, or personal navigation device having its own display. When the user is not in a position to look at the display (e.g., while in a live combat scenario, while driving a vehicle, etc.), the display may be disabled and input may switch from a touch screen display on wearable computer core 102 to direct gesture input at touch pad 104.

While FIG. 1 shows the connection to display 106, it should be noted that varying other combinations of a display and wearable computer may be provided according to other embodiments of the present disclosure. For example, in some embodiments wearable computer 102 can be operated without a display (e.g., using only touch pad 104 input and only audio output 110). In such embodiments, the system can advantageously operate without the user providing audible inputs and without the user looking at a user interface. In yet other embodiments, a connection to display 106 may be available but turned off by default.

Referring still to FIG. 1, wearable computer core 102 is shown as communicably connected (e.g., wirelessly, via a wire, etc.) to audio input 108. Audio input 108 may be a small microphone embedded in a helmet worn by the user, a small microphone embedded in an earpiece, a microphone embedded in a headset, embedded in glasses worn by the user, embedded, clipped, or pinned to a piece of clothing, or any other type of microphone or other audio input device.

Wearable computer core 102 is further shown as communicably connected (e.g., wirelessly, via a wire, etc.) to audio output 110. Audio output 110 may be a small earpiece (e.g., having one or more speakers) worn by the user, a headset or headphones worn by the user, an earpiece coupled to a helmet, an earpiece coupled to glasses, or one or more in-ear speaker elements.

Wearable computer core 102 is further shown as communicably connected (e.g., wirelessly, via a wire, etc.) to tactile I/O device 473. Tactile I/O device may be a small transducer, vibrating element, or force-feedback device configured to output (and in some cases also input, in the case of a force feedback device) tactile sensations to a user. In some cases tactile output may be conducted or commanded in the place of or to complement or supplement audio output. For example, in a soldier scenario, a user may have one or more tactile output devices coupled to his or her body. The soldier may be guided by mission command using tactile outputs rather than by repeated audio instructions. A buzz on the soldier's right leg, for example, may mean to head right while a buzz on the soldier's left leg may mean to turn left. Such tactile 10 devices can also be used to confirm or deny actions, confirmations, or communications involving the touch pad of the present application.

Wearable computer core 102 is further shown as communicably connected (e.g., via a wired connection or wirelessly) to one or more sensors 475. Sensors 475 may be or include any number or types of sensors. For example, sensors 475 may include environment sensors configured to provide temperature, humidity, air quality, and other information about the environment being occupied by the user of core 102. As another example, sensors 475 may include a pulse sensor configured to measure a user's pulse and other health information related to the user. As another example, sensors 475 may include an accelerometer or other motion sensor that is configured to track user movement and tendencies. Sensors 475 may further include light sensors, vibration sensors, or any other type of sensor.

Referring still to FIG. 1, wearable computer core 102 is shown as communicably connected to a wireless network 111 and to one or more of a master device 112, peer devices 114, or a remote data source 116. A master device 112 may be a device carried by a group leader and for providing command or coordinating objectives and communications with the group (e.g., wherein a group member carries the wearable computer). It should be noted that each member of a group may carry a wearable computer and accompanying user interface as illustrated in FIG. 1, including the group leader. When the group leader carries a wearable computer, wearable computer core 102 may expose a "group leader" set of direct touch pad 104 gestures that cause wearable computer core 102 to issue commands or command information to other devices in the group.

Peer devices 114 may be other wearable computers similar or identical to that shown in FIG. 1. In other embodiments, while one user carries a wearable computer, another user can carry a conventional communicator (e.g., laptop computer, handheld radio, etc.) and wearable computer core 102 may transmit appropriate data for that communicator (e.g., directed communication rather than broadcast communication).

Remote data source 116 may be any data source (e.g., any remote computer) configured to receive data from or to send data to wearable computer core 102. For example, remote data source 116 may receive data relating to a position or location of the user of wearable computer core 102 and store the data.

Figure 2:
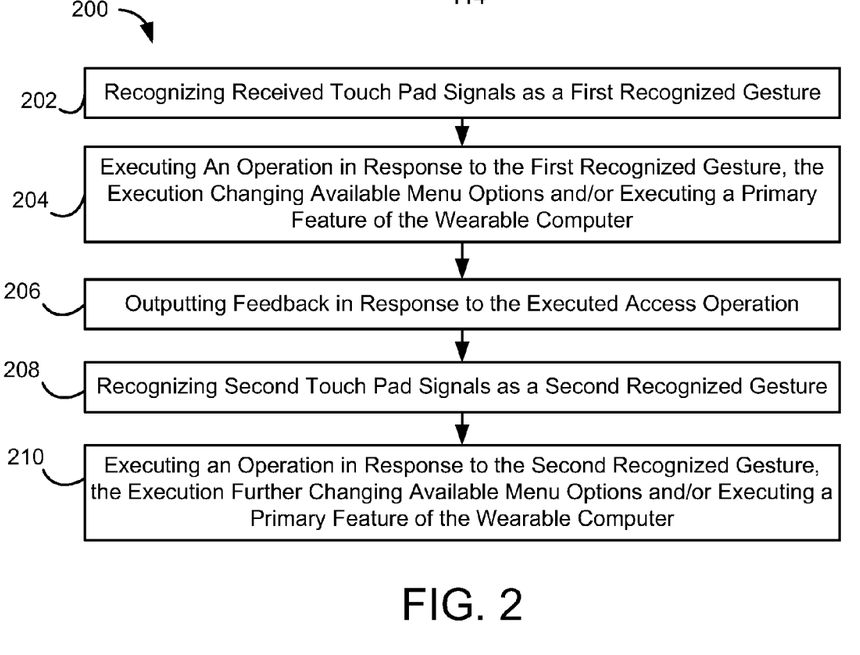
FIG. 2 is a flow chart of a process for operating a wearable computer of the user interface system, according to an exemplary embodiment.

Referring now to FIG. 2, a flow chart of a process 200 for operating a wearable computer is shown, according to an exemplary embodiment. FIG. 2 relates to using a touch pad (e.g., the touch pad 104 of FIG. 1) to control a wearable computer (e.g., including wearable computer core 102 of FIG. 1). The process of FIG. 2 more particularly relates to using a series of at least two gestures to navigate a hierarchical menu structure, although, in other embodiments, one or two of a combination of gestures may also execute a primary function. The process of FIG. 2 advantageously allows operation of the wearable computer and the initiation of computing tasks (e.g., communication tasks, navigation tasks, scheduling tasks, control tasks, etc.) via a series of gestures that do not require visual menu operation or voice recognition. The user can advantageously conduct the wearable computer's user interface operations without making noise and without diverting vision from a mission critical scene or object.

Process 200 is shown to include recognizing received touch pad signals as a first recognized gesture (step 202). The recognition of step 202 may be conducted by circuitry local to touch pad 104, by circuitry of wearable computer core 102, or a combination of circuitry for touch pad 104 and wearable computer core 102. A gesture may range from a single press or tap to a series of taps or swipes, according to varying embodiments. For example, a gesture may include an "x" mark made with two swipes. As another example, the gesture may be a three finger swipe to the right, or any other type of finger motion involving any number of fingers.

Process 200 is further shown to include executing an operation in response to the first recognized gesture (step 204) or executing a primary function of the wearable computer. The operation may include looking up an association between the first recognized gesture and a first level of a hierarchical menu. The operation may also include conducting one or more active steps relating to a feature of the wearable computer. For example, such an active step may include transmitting a request for information to another device (e.g., one or more of master devices 112, peer devices 114, or remote data source 116 as illustrated in FIG. 1). Such an active step may include a plurality of sub-steps (e.g., processing position information for a plurality of users and preparing an audible report for playback to the user).

Process 200 further includes outputting feedback in response to the executed operation (step 206). The feedback may include audio feedback via audio output 110. The feedback may be in the form of a spoken confirmation of a hierarchical menu selection (e.g., "comm. mode selected", "nav. mode selected", etc.). In varying embodiments, the feedback may also or alternatively be visual (e.g., a small icon may appear on HMD glasses that indicates the communications mode or the navigation mode have been selected). The feedback can also include the results of any processing conducted in response to the executed operation. For example, a display may show the results of position processing for the rest of the users in a field or group.

Process 200 also includes recognizing second touch pad signals as a second recognized gesture (step 208), according to an exemplary embodiment. The second recognized gesture may be a gesture similar or different to the first recognized gesture. As with the first recognized gesture, the recognition itself may be conducted by circuitry of the touch pad and/or the circuitry of the wearable computer core.

Process 200 is further shown to include the step of executing an operation in response to the second recognized gesture (step 210). Step 210 can include further changing available menu options (e.g., causing availability of a third level of menu options) or executing a primary feature of the wearable computer. A primary feature of a wearable computer may be any non-menu navigation or selection feature configured to provide an I/O result desired by the user. For example, if the device is a navigation device, a primary feature of the wearable computer system may be to provide the user with a map view of the surrounding area.

Referring now to FIG. 3A-F, various configurations of a touch pad and wearable computer are shown, according to exemplary embodiments. Referring generally to the figures, a touch pad and wearable computer assembly generally includes a touch pad area where the touch pad is installed. The touch pad may be held to the touch pad area via a band configured to hold the touch pad to a particular body part (e.g., an arm or leg of the user). The touch pad area may be detachable from the band in some embodiments. The touch pad area may also include a fastener (e.g., Velcro, snaps, webbing, etc.) configured to attach the touch pad to the band or another object (e.g. a rifle, a chest mount, etc.).

Figure 3A:
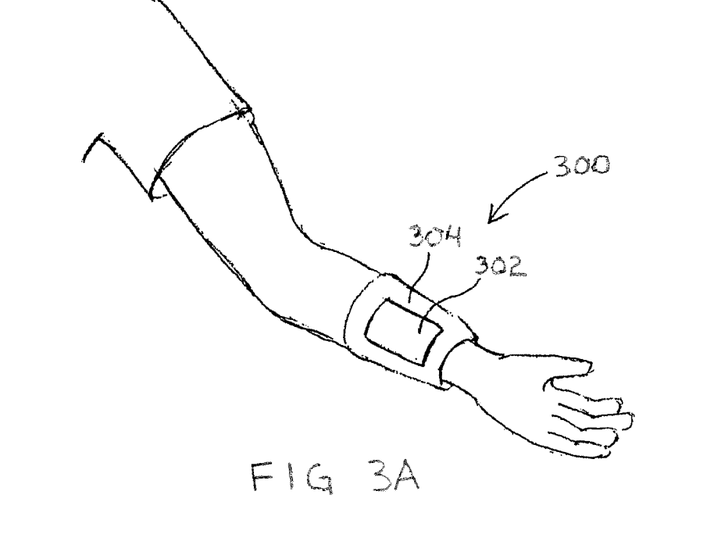
FIG. 3A-F are illustrations of touch pads of the user interface system in various environments and embodiments.

Referring now to FIG. 3A, in environment 300, the touch pad is shown as a wrist-mounted device having a touch pad area 302 and band 304. Touch pad area 302 is shown as being curved. Touch pad area 302 may be rigid and curved. In other embodiments, touch pad area 302 may be flexible and optionally curved or flat (e.g., depending on how the pad is flexed). In embodiments where touch pad area 302 is curved, it may be flexible enough to be relatively conformal to curved surfaces (e.g., such as an arm band 304 as shown or shirt sleeve). In other embodiments, touch pad 302 may be flat and rigid.

In an exemplary embodiment, the touch pad may be adhesive or Velcro backed. In other embodiments, other physical mounting or coupling arrangements may be used. For example, the touch pad may fit into a pocket (e.g., a pocket of an arm band as shown in FIG. 3A), have a snap-fit mounting connection, or another suitable connection.

In varying exemplary embodiments, the touch pad may be sized differently. In some embodiments, the touch pad may be sized to be relatively small (e.g., 1.5"×1.5"×0.1"). Other sizes may be used in different embodiments. In the embodiment in environment 300, touch pad area 302 is larger and is in the shape of a large rectangular area. In other exemplary embodiments, the touch pad may be shaped or sized differently. Different touch sensitive technologies or a combination of touch sensitive technologies could be used depending on the application (e.g., whether to be used in a wet or humid environment). For example, the touch sensitive technology may be multi-touch capacitive sensing, surface capacitive sensing, projected capacitive sensing, another type of capacitive sensing, resistive technology, optical touch sensing, infrared touch sensing, force-based sensing, or other suitable sensing technologies. Depending on the type of technology glove fingertips may need to be embedded with conductive material or another activating material.

The touch pad can be single touch or multi-touch, depending on the touch technology selected and the number of menu options or commands desired to be available. The touch pad can include a wired interface (e.g., USB, optical digital, etc.) or a wireless interface (e.g., wireless transceiver, BLUETOOTH transceiver) and internal batteries (e.g., a coin cell, a flat lithium ion pack, a rechargeable battery, a single use battery, etc.). The casing for the touch pad may be water resistant. In an exemplary embodiment, the touch pad may be surrounded by a thin replaceable film to provide for moisture and dirt or sand protection.

In an exemplary embodiment, multiple touch pads may be used in one system. Multiple touch pads may be daisy-chained, for example, to provide for increased touch sensing area or for providing multiple separate input options (e.g., where one touch pad operates navigation features and another touch pad operates communication features).

Figure 3B:
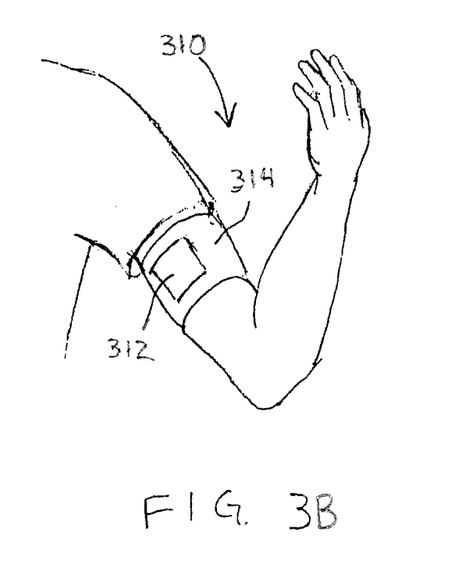
Figure 3C:
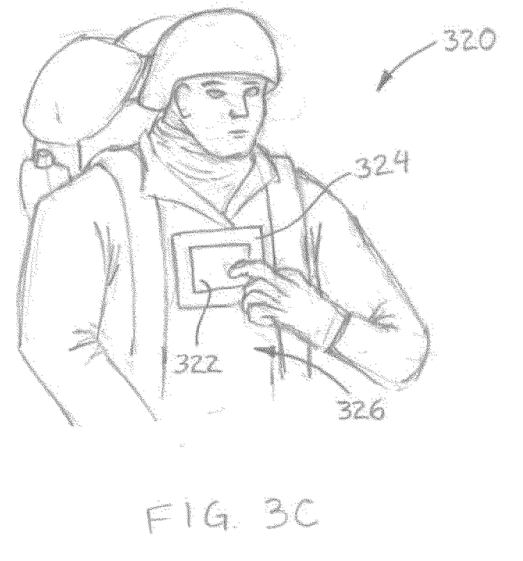

Referring to FIG. 3B, another environment 310 illustrating an exemplary touch pad with touch pad area 312 and band 314 is shown. Touch pad area 312 is shown as being relatively square compared to touch pad area 302 of FIG. 3A. Touch pad area 312 is shown as located on the upper arm of a user, compared to the lower arm area of the user as shown in FIG. 3A.

In various embodiments, the touch pad of the present disclosure may be configured to be worn by a user in any arm location, or in any other body location. For example, as shown in environment 320 of FIG. 3C, the touch pad may be located on the chest 326 of the user. Touch pad area 322 may attach to a base 324 located in the chest area of the user. Touch pad area 322 may fasten to base 324 via Velcro, according to one embodiment. According to other embodiments, touch pad area 322 may fasten to base 324 in other ways.

Figure 3D:
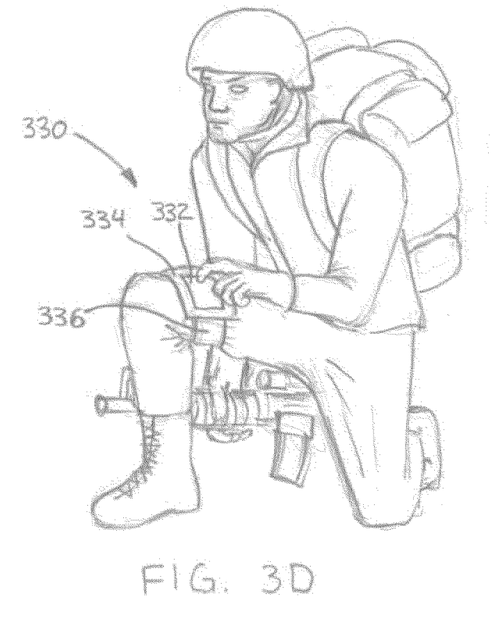

As another example, as shown in environment 330 of FIG. 3D, the touch pad is shown as mounted in an upper-leg area of the user. Touch pad area 332 may be mounted on a base 334 coupled to a band 336 such that the user may use the touch pad when the user is kneeling, sitting (e.g., in a vehicle, in a cockpit, etc.) or in a crouched position. In the embodiments of FIGS. 3A-D, the base to which the touch pad is attached can be rigid, flexible, a padding, a piece of stretchable material, or another material. In other embodiments, the touch pad may be secured directly to a band, strapping system, or another user surface without the use of a base. While the embodiments of FIGS. 3A-D illustrate the touch pad in an arm, chest, or leg area of the user, the touch pad may be attached or located to any other body location, and the band may be configured to stretch around varying areas of the user's body.

Figure 3E:
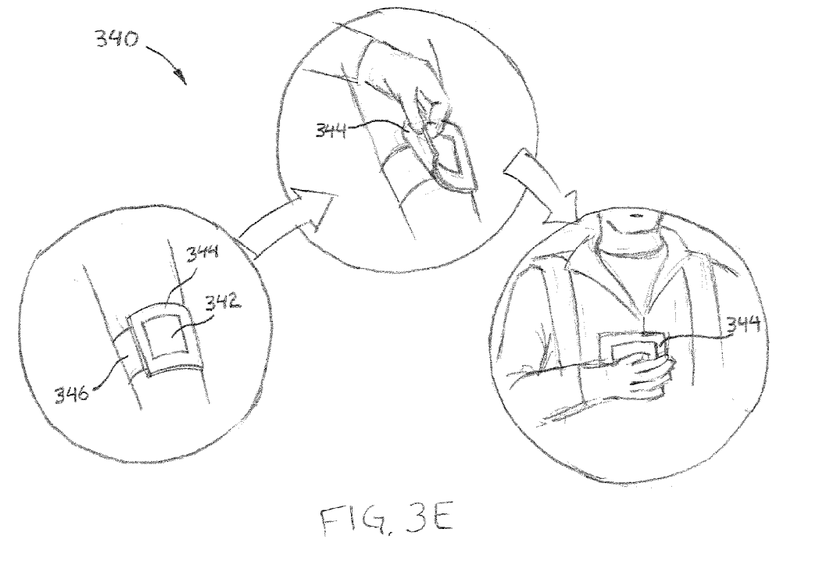

Referring now to FIG. 3E, a method of attaching and detaching a touch pad area and band are shown in environment 340. Touch pad 342 and first base 344 are shown as being detached from a second band or base 346. After removing touch pad 342 and base 344 from band 346, touch pad 342 and base 344 may be attached to another area of the body (e.g., the chest). In one embodiment, base 344 may be Velcro-backed or have another fastening material that is configured to attach to both band 346 and the chest-location such that the user may detach and attach the touch pad and its base 344 as necessary. This may allow the user to attach the touch pad to another area of the body, or to an external location, (e.g., if the user is a pilot, the touch pad may be attached to a nearby control panel or wall.

Figure 3F:
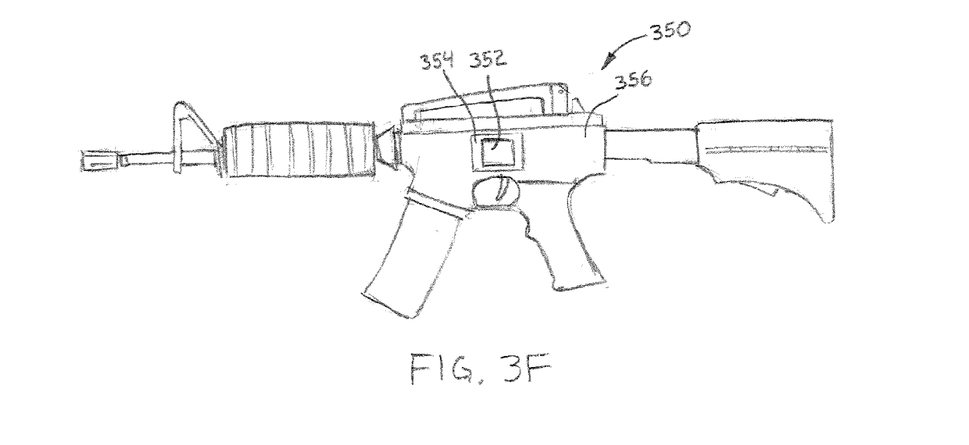

As another example, the touch pad may be coupled to a piece of equipment and may be detachable so that a user may change the location of the touch pad around during equipment operation. Referring now to FIG. 3F, one such environment 350 is shown. Touch pad area 352 and base 354 are shown coupled to a rifle stock 356. Touch pad area 352 and base 354 may be detached from a band attached to the user and placed on rifle stock 356 as shown when a user wishes to maintain contact with the touch pad while engaging with the rifle. The touch pad may maintain a wired or wireless connection with the wearable computer, or the wearable computer may be carried around as well as part of the touch pad assembly.

Figure 4:
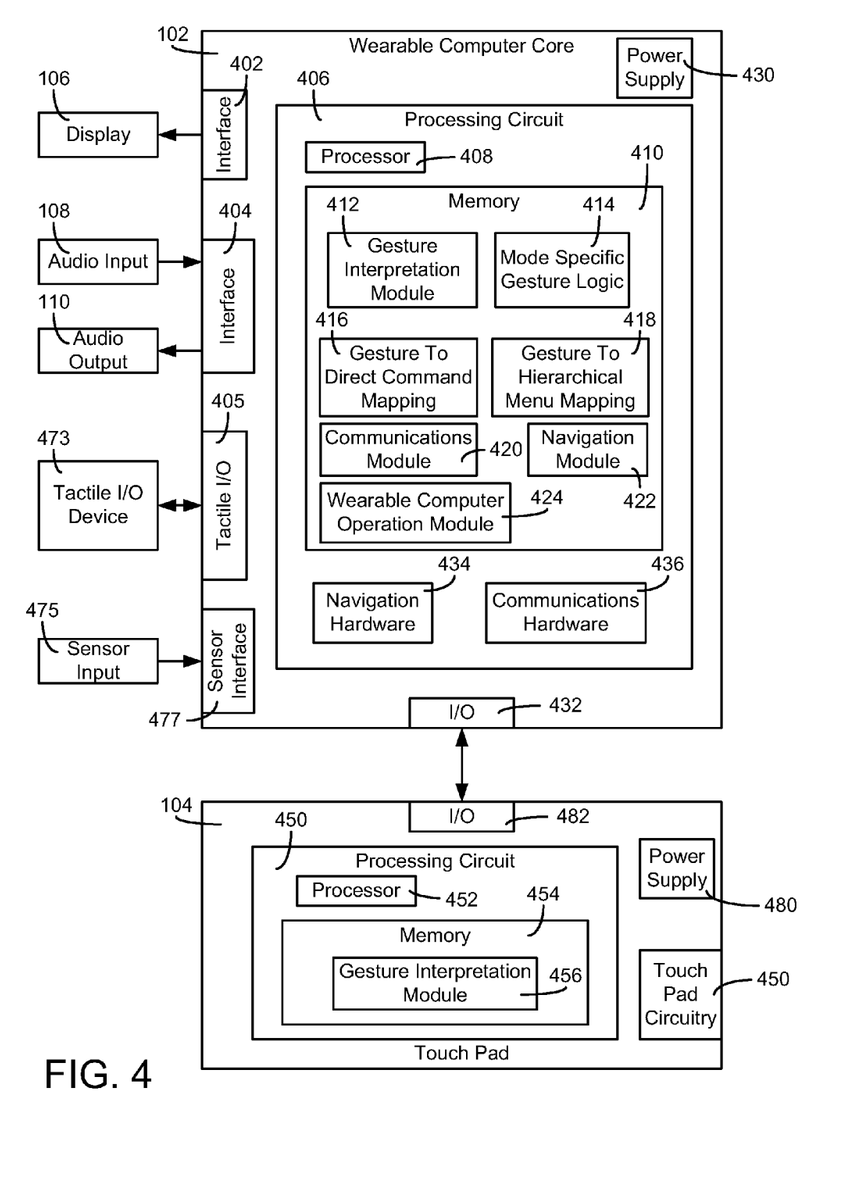
FIG. 4 is a more detailed block diagram of the wearable computer and touch pad of FIGS. 1-3, according to an exemplary embodiment.

Referring now to FIG. 4, a more detailed block diagram of wearable computer core 102 and touch pad 104 are shown, according to an exemplary embodiment. Wearable computer core 102 is shown to include a display interface 402 and audio interface 404. Display interface 402 may be configured to send data to display 106 for display to the user. Audio interface 404 may be configured to receive a user input from an audio input 108 and to transmit data for output via audio output 110. Tactile interface 405 may be configured to transmit and/or receive appropriate communication or electrical signals to/from tactile IO 473. Tactile IO 473 may be a small transducer configured to communication tactile input to a user or to use tactile input to supplement control provided to the touch pad. In an exemplary embodiment, tactile IO 473 may be a small tactile pointing device configured to supplement input activities conducted by the touch pad 104. Wearable computer core 102 is further shown to include a sensor interface 477 configured to receive sensor input 475 from the one or more sensors connected to wearable computer core 102. For example, the sensor input may relate to an environment condition (e.g., temperature, humidity, if the user is indoors or outdoors, etc.) of the environment the user is occupying, a pulse sensor reading that indicates the pulse of the user, a motion sensor reading that indicates user motion, or otherwise. Sensor interface 477 may receive the various sensor inputs and provide the sensor inputs to processing circuit 406. The use of the sensor inputs by processing circuit 406 is described in greater detail in FIG. 5.

Wearable computer core 102 includes a processing circuit 406 including a processor 408 and memory 410 for completing the activities described herein. Processor 408 may be implemented as a general purpose processor, an application specific integrated circuit (ASIC), one or more field programmable gate arrays (FPGAs), a group of processing components, or other suitable electronic processing components. Memory 410 is one or more devices (e.g., RAM, ROM, Flash memory, hard disk storage, etc.) for storing data and/or computer code for completing and/or facilitating the various processes described herein. Memory 410 may be or include non-transient volatile memory or non-volatile memory. Memory 410 may include data base components, object code components, script components, or any other type of information structure for supporting the various activities and information structures described herein. Memory 410 may be communicably connected to processor 408 and includes computer code or instructions for executing one or more processes described herein.

Memory 410 is shown to include various modules for completing the activities described herein. Memory 410 is shown to include a gesture interpretation module 412. Gesture interpretation module 412 may be configured to receive a gesture or gesture information from a touch pad 104 and to determine gesture properties for interpreting the type of gesture. For example, gesture interpretation module 412 may identify a gesture based on the number of fingers or other objects that came in contact with the touch pad (e.g., a gesture including two fingers, three fingers, etc.), the amount of time the fingers or other objects were in contact with the touch pad (e.g., more than one second, less than one second, etc.), the pressure applied to the touch pad (e.g., if a user lightly touched the touch pad or pressed down hard on the touch pad), the motion of the fingers or other objects in contact with the touch pad (e.g., making contact with the touch pad and then sliding the fingers up, down, left, right, in a circular motion, or in any other type of motion; moving different fingers in different directions, etc.), the speed of the motion of the fingers or other objects in contact with the touch pad (e.g., a swiping motion, a slow dragging of the fingers, etc.), or any other type of activity. Gesture interpretation module 412 may, as a result, define a set of gesture properties that may be used to match the gesture to a predetermined activity to be executed by processing circuit 406. For example, gesture interpretation module 412 may use gesture properties to identify specific gestures defined by one of mappings 416, 418.

The gesture properties and other gesture information may be used by mode specific gesture logic 414. The mode of wearable computer core 102 may be in one of multiple states that may dictate how gestures are interpreted. For example, wearable computer core 102 may be set in a communications mode configured to allow the user to communicate with other users or devices. As another example, wearable computer core 102 may be in a navigation mode configured to allow a user to interact with location and position information via touch pad 104. As yet another example, wearable computer core 102 may be set in a sensing mode configured to evaluate the surrounding environment. Mode specific gesture logic 414 may be used to generally determine if a gesture interpreted by gesture interpretation module 412 relates to a direct command (e.g., a command executable by the wearable computer such as relaying a message to other users), a menu selection (e.g., changing modes, selecting one or users to communicate with), an acknowledgement (e.g., the user acknowledging information displayed or output by the user interface), data entry (e.g., entering coordinates, entering a user's current state), or another type of input.

Using gesture information from module 412 and wearable computer information from logic 414, wearable computer core may be configured to match up a gesture and resulting instructions or commands to the user input. Memory 410 includes a gesture to direct command mapping 416 and gesture to hierarchical menu mapping 418. Mappings 416, 418 may be used to match gesture properties and the wearable computer mode to a specific gesture and resulting instructions and commands. Gesture to direct command mapping 416 may include mapping of gestures to specific commands to be executed by the wearable computer. For example, such commands may include an instruction to send a message to other wearable computers, an instruction related to group tactics (e.g., to hold a position, to progress forward or in another direction, to proceed with caution, etc.), an instruction for identifying a current location or position (e.g., to identify to another user or group leader that the user of wearable computer 102 is in proper position, along with the actual position) or otherwise. Gesture to hierarchical menu mapping 418 may include mapping of gestures to specific menu commands of the wearable computer. For example, the user may be presented with a list of menu options via display 106 (e.g., an option to send a message to other users, an option to change modes of the wearable computer, etc.) and mapping 418 may be used to identify a selection of a menu option.

In one embodiment, the same gesture may be mapped in both mappings 416, 418. In other words, gestures may have multiple meanings based on which mode the wearable computer is in. As an example, a gesture of a single finger swiping downward on touch pad 104 may have a mapping in both gesture to direct command mapping 416 (e.g., a command to hold a position) and in gesture to hierarchical menu mapping 418 (e.g., a command to the wearable computer to enter a communications mode). In such an embodiment, the current mode of operation of the wearable computer may be used to select the appropriate mapping. For example, if the wearable computer is in a communications mode, the gesture may be determined to indicate that the hold position command is to be provided to other users. If the wearable computer is in a navigation mode, the gesture may be determined to indicate a desire to switch modes.

After mapping gesture properties and a wearable computer mode to a specific gesture and command or instruction, memory 410 may include various modules for carrying out the commands and instructions. Memory 410 may include a communications module 420. Communications module 420 is configured to receive a command or instruction related to communications with other users and wearable computers. For example, the user of the wearable computer may be a group leader, and the group leader may provide a gesture relating to a team command (e.g., all units move up, fall back, reposition, etc.). Communications module 420 may receive the command and may be configured to generate a message to send to all other users. In one embodiment, a group leader may provide a gesture to the wearable computer indicating that further gestures about to be provided are commands to be provided to other group members. Communications module 420 may receive the initial command, identifying other wearable computers to send the message to, and then receive the actual group member commands.

As another example, a user of the wearable computer may provide a gesture relating to a connection status to other users. For example, the group leader or other user may wish to only communicate with one or more of the group members instead of all group members. Communications module 420 may receive instructions on which group members are to be provided a message, followed by the actual message via gestures from the group leader.

Communications module 420 may be configured to facilitate such communications wirelessly between the wearable computers (and other devices). For example, communications module 420 may allow different users of wearable computers to communicate with one another. As another example, a central computer or remote computer may receive communications from the wearable computer via communications module 420. Communications module 420 may be configured to facilitate these communications only based on gestures received from the user. In other words, the communications can be accomplished with a selection or input from a visual or audible menu.

In one embodiment, communications module 420 may be configured to facilitate conversation between the user of the wearable computer and another user (of another wearable computer or of another remote device). For example, a gesture may be provided by the user to change the mode of the wearable computer, allowing the user to open dialogue with another user. Another gesture may be provided to indicate the one or more other users the user wants to converse with, or a single gesture may be used to both indicate a mode change and select the users.

In one embodiment, communications module 420 may be configured to handle user requests. For example, the user may request, via gesture, additional instructions (e.g., whether to advance, hold position, instructions to the next waypoint, etc.) or assistance (e.g., requesting a medic). Communications module 420 may receive the gesture and generate a message to send to another wearable computer or remote device, and may determine the appropriate destination of the message (e.g., to other team members, to a group leader, to a medic, etc.).

Processing circuit 406 is shown to include communications hardware 436 that may be used in conjunction with communications module 420 to provide communication services for the wearable computer. Communications hardware 436 may be configured to establish a wireless connection with one or more other wearable computer cores, master devices, peer devices, or other remote data sources. Communications hardware 436 may be configured to facilitate communication via a wide area network (WAN), local area network (LAN), or any other type of network via any type of wireless connection (e.g., WiFi).

In one embodiment, the transmissions between the wearable computer core and the other devices (e.g., other wearable computer cores, master devices, peer devices, etc.) may be encrypted. Communications module 420 and communications hardware 436 may be configured to encrypt messages sent to other devices and to decrypt messages received from other devices.

Memory 410 may further include a navigation module 422. Navigation module 422 may use commands and instructions provided by a user via gestures to identify a user location and position. For example, when a user reaches a specific location or position, the user may provide the appropriate gesture. Navigation module 422 may receive indication of the gesture and identify the exact position of the user and wearable computer. Further, navigation module 422 may send the user position to communications module 420 for providing the position to other users if specified by a predetermined protocol or by the user in position. Navigation module 422 may record such information without receiving a selection from a visual or audible menu.

In one embodiment, upon receiving the gesture from the user of the wearable computer, navigation module 422 may identify the user location and mark the location as a navigation waypoint. Navigation module 422 may include a navigation database, and a navigation waypoint may be marked within the database. The navigation waypoint may be identified by the user gesture without receiving an input from a visual or audible menu of the wearable computer.

Processing circuit 406 is shown to include navigation hardware 434 that may be used in conjunction with navigation module 422 to provide navigational services to the wearable computer. In one embodiment, navigation hardware 434 may be a global positioning system (GPS) receiver or other satellite navigation system, an inertial guidance system that tracks a user position, orientation, and movement, or any other type of system. Navigation module 422 may use the features of navigation hardware 434 to track user location or movement (e.g., navigation module 422 may include one or more maps that, upon receiving a position input from the user, navigation module 422 may track user movement on a map without further user input).

Memory 410 may further include a wearable computer operation module 424. Wearable computer operation module 424 may be configured to manage operation of the wearable computer upon receiving a user command or instruction. For example, module 424 may receive a command related to a hierarchical menu selection (e.g., a selection of a navigation mode, communications mode, sensing mode, etc., of the wearable computer). Module 424 may receive the command and provide an interface on display 106 allowing the user to provide further gestures.

Referring further to FIG. 4, touch pad 104 is shown to include a processing circuit 450 including a processor 452 and memory 454. Processor 452 may be implemented as a general purpose processor, an application specific integrated circuit (ASIC), one or more field programmable gate arrays (FPGAs), a group of processing components, or other suitable electronic processing components. Memory 454 is one or more devices (e.g., RAM, ROM, Flash memory, hard disk storage, etc.) for storing data and/or computer code for completing and/or facilitating the various processes described herein. Memory 454 may be or include non-transient volatile memory or non-volatile memory. Memory 454 may include data base components, object code components, script components, or any other type of information structure for supporting the various activities and information structures described herein. Memory 454 may be communicably connected to processor 452 and includes computer code or instructions for executing one or more processes described herein.

Memory 454 is shown to include a gesture interpretation module 456. Module 456 may have the same general functionality as gesture interpretation module 412. In various embodiments, either or both of wearable computer core 102 and touch pad 104 may be configured to determine gesture properties based on a gesture input from a user. In one embodiment, gesture information is sent from touch pad circuitry 450 to module 412 and wearable computer core 102 after processing by module 456 of touch pad 104. In another embodiment, module 456 may determine gesture properties, and wearable computer core 102 and module 412 may use the properties to match a gesture with a command or instruction via mappings 416, 418.

Touch pad 104 is shown to include touch pad circuitry 450. Touch pad circuitry 450 is configured to receive an input (e.g., a gesture from a user of touch pad 104) and to send the input for processing to processing circuit 452.

Both wearable computer core 102 and touch pad 104 are shown to include a power supply 430, 480. Power supply 430, 480 provide a power source to wearable computer core 102 and touch pad 104, respectively. Power supply 430, 480 may be battery packs with or without recharging features.

Wearable computer core 102 and touch pad 104 further include an input/output (I/O) interface 432, 482, respectively. Interfaces 432, 482 are configured to facilitate communications between wearable computer core 102 and touch pad 104. For example, touch pad 104 may receive a user input relating to a gesture, and interface 482 may be configured to transmit signals representative of the gesture (or other gesture information) to wearable computer core 102 via interface 432. The connection between interfaces 432, 482 may be wired or wireless.

Figure 5:
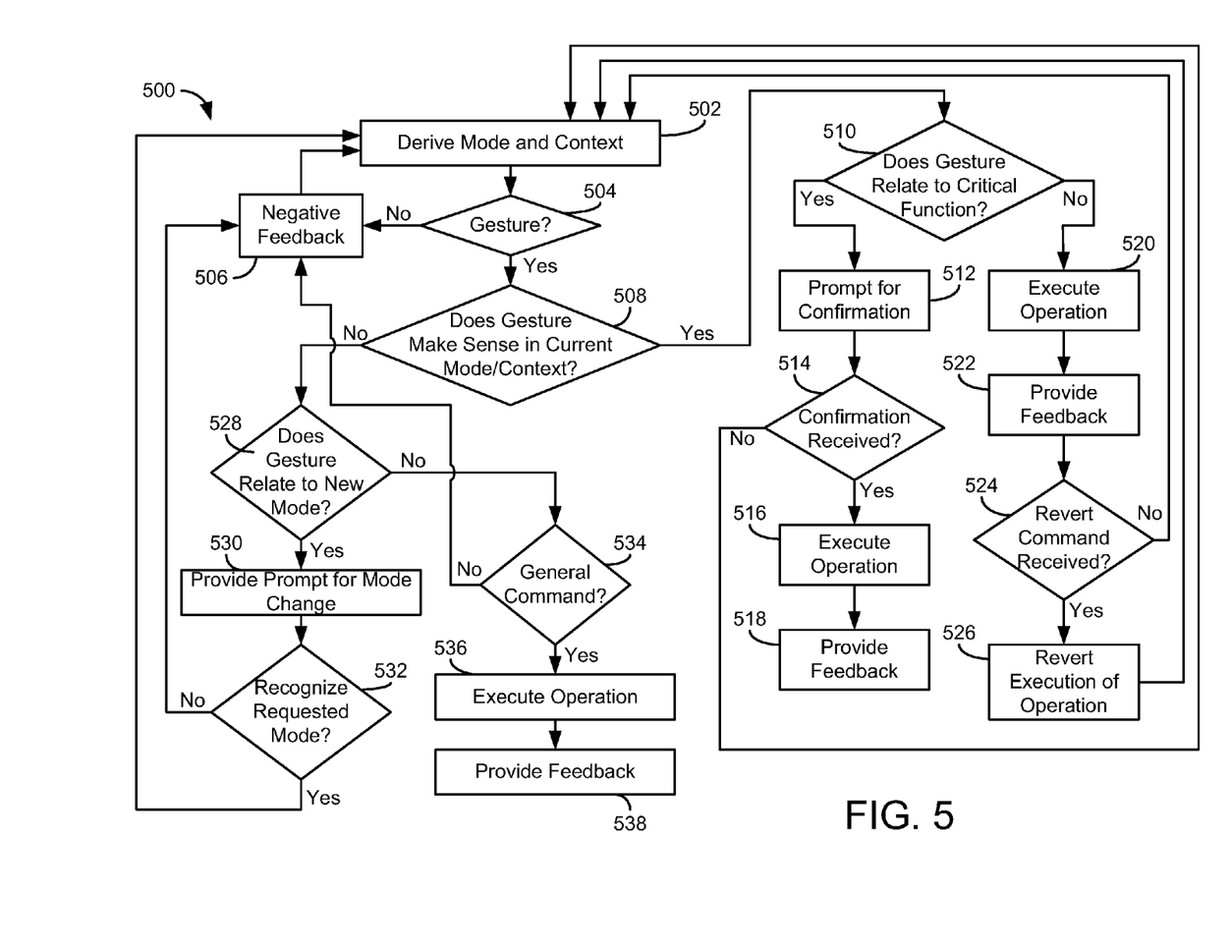
FIG. 5 is a flow chart of a process of touch pad operation of the user interface system, according to an exemplary embodiment.

Referring now to FIG. 5, a flow chart of a process 500 for touch pad operation of the user interface system is shown, according to an exemplary embodiment. Process 500 may be executed upon receiving an input from a user via a touch pad of the user interface system described herein. The input may be a gesture relating to an operation to be executed by the wearable computer core, a gesture relating to a change in the operating mode of the user interface system, or a general command relating to the user interface system. Process 500 may be executed in order to allow a user to provide input and for the wearable computer to convey a rapid acknowledgement of the user input. The acknowledgement may relate to a confirmation of a command or request, positive or negative feedback relating to the command, or otherwise.

Process 500 includes deriving (either by content or through recall) the mode and context of the user interface system (step 502). The mode may be the current operating mode of the user interface system (e.g., navigation mode, communications mode, sensing mode, or another mode as described in the present disclosure). The context may be or include information about current usage of the user interface system. For example, the context may include that the user interface system is currently being used by a user to conduct broadcast communications to provide commands to a group of other users (e.g., as opposed to point-to-point communications where individual confirmations or denials can be used), to generally navigate, or to simply confirm or deny commands.

Process 500 includes determining whether a user input is a gesture or not (step 504). Step 504 may be executed by, for example, a gesture interpretation module 412 comparing input information to gesture mappings 416, 418. If the input is not a gesture, negative feedback may be provided (step 506) and process 500 may be reset upon receiving a new user input. In one embodiment, sensor input information may be used to determine if a user input is a gesture or not. For example, if the user is in motion, a motion sensor may recognize the motion and determine if a user input at the touch pad was incidental or not. As another example, if a vibration sensor detects vibration at the touch pad, the vibration information may be used to better recognize the gesture (e.g., if a user's hand is shaking as the user is operating the touch pad, step 504 may include interpreting the gesture based on the vibration tendencies).

If the user input is identified as a gesture, process 500 includes determining if the gesture makes sense in the current mode and context of the user interface system (step 508). For example, after mapping the input to a specific gesture and operation in step 506, step 508 may check the specific gesture and operation to see if the operation is executable or makes sense given the current mode and context of the user interface system (e.g., if the system is in a communications mode, the gesture should relate to a command or report that can be transmitted to other users). Step 508 may further include determining if the specific gesture relates to a general data entry command (e.g., indicating that the user is in position, if the user has completed a task, etc.). Step 508 may further include receiving a sensor input and determining if the gesture makes sense given a current user status relating to the sensor input. For example, if a pulse sensor indicates an increased heart rate or other medical issue with the user (e.g., if the user is stable, if the user has increased tension, if the user's vital signs are otherwise indicating a problem), step 508 may include checking if the gesture relates to an emergency or medical-related command instead of a command related to navigational or communication functions. As another example, if an environment sensor indicates an unusual environmental situation (e.g., extreme temperature, smoke, low air quality), then step 508 may include checking if the gesture relates to a critical function such as providing a warning or command to other users relating to the current environment.

If the gesture makes sense, process 500 further includes determining whether the gesture relates to a critical function (step 510). A critical function may be a function that is mission critical (e.g., relaying that a user is in position to attack, commanding movement of a group of other officers, etc.) or that requires additional confirmation or safeguards before carrying out. If the gesture does relate to a critical function, then the user may be prompted for confirmation (step 512) before executing an operation related to the critical function. For example, if the critical function involves transmitting a command for others (e.g., an attack order to other soldiers of a unit), the confirmation may be required before sending such information. If confirmation is received (step 514), then the operation may be executed (step 516) and feedback (either positive feedback or negative feedback relative to the execution of the operation) may be provided to the user (step 518). If no such confirmation is received or if negative input is received, the original gesture may be ignored and process 500 may return to step 502 and wait to receive another gesture.

In one embodiment, sensor input information may be used in addition to confirmation and feedback information provided by the user at steps 510-518. For example, if a motion sensor detects that a user is running, the critical function may be executed at step 516 without the need for confirmation at steps 512-514, since the user would have to stop running or moving in order to provide the confirmation. As another example, if the gesture relates to a request for medical help, and a pulse sensor detects a health problem with the user, there may be no need for confirming the medical-related gesture at steps 512-514.

If the gesture does not relate to a critical function, the operation associated with the gesture may be executed (step 520) and feedback may be provided (step 522). The user may then choose whether to revert or recall the command received by the user interface (step 524). If the user wishes to revert or recall the command, then the execution of the operation may be reverted or recalled, e.g., by broadcasting a message that specifies the last message has been cancelled (step 526). Since the operation is not a critical function, the operation may be executed without user confirmation, and the user may later determine whether to revert the operation or not. For example, the user may provide an incorrect gesture, and may be prompted at step 524 to verify the execution of the corresponding operation. The user may then realize the gesture was incorrect and reverse the operation.

If the gesture does not map to an appropriate operation for the given mode and context of the user interface system, process 500 includes determining if the gesture relates to a new mode request (step 528). For example, the user may provide a gesture indicating that the user wants to change modes of the user interface system (e.g., from a navigation mode to a communications mode). If the gesture relates to such a request, process 500 includes providing a prompt (e.g., audio prompt or other modality) for the mode change (step 530) to the user. The user may then provide an input (audio or another input) confirming the mode change. If the requested mode of the input is recognized by the system (step 532), operation of the user interface system may continue in the new mode. If the requested mode input is not recognized, negative feedback may be provided to the system (step 506) and the new mode may not be provided.

If the gesture received does not relate to the current mode and context or to a new mode, process 500 may include determining if the gesture relates to a general command (step 534). A general command may relate to general operation of the user interface system, such as turning on or off the system, turning on or off a microphone or other audio input or output of the user interface system, or otherwise. If the gesture relates to a general command, the operation relating to the general command may be executed (step 536) and feedback may be provided to the user (step 538) indicating as such. If not, then the gesture may be deemed to not be executable or identifiable by process 500, and negative feedback may be provided to the system (step 506).

The user interface system as described in the present disclosure may be implemented and applied to a variety of environments. For example, a group of military or police members may use the user interface system as a group. Military personnel or police may be required to handle a weapon with one or both hands, and may further be engaged in either an offensive or defensive position that requires the person to have his or her eyes and ears free to observe the surroundings. Such a user may use the touch pad and wearable computer described herein with minimal interference to the user's attention to the surroundings, whether the touch pad is mounted to the user or to the weapon. When using the touch pad mounted on the user (e.g., on the arm as shown in FIG. 3), other actions can be implemented rapidly and without reliance on a display or other visuals via input gestures. Such operation of the touch pad may further allow for covert delivery of information and instructions (e.g., instructions not requiring vocal responses or significant movement). The various operations may include a text entry (e.g., the user may "write" text on the touch pad, and the wearable computer may use OCR or other text recognition techniques to confirm inputs).

As another example of an implementation of a user interface system of the present application, a squad of police officers each may have a touch pad and wearable computer (e.g., hidden in clothing, attached to the chest or arm). The user interface system allows for communication between the members covertly. For example, a squad leader may deliver instructions (e.g., to search for a target) to other squad members via the touch pad and wearable computer when other forms of communication are impractical (e.g., if it is nighttime and no one can see each other). As another example, if a target is found, a squad member or leader may relay such a message using a touch pad gesture (e.g., drawing an "V" on the touch pad for visual contact) quietly and quickly without risk of exposure to the target. As another example, each member of the squad can engage the target with a weapon, and each weapon may include a touch pad (the wearable computer may be carried by the user's clothing or also coupled to a portion of the weapon), allowing each user to communicate with other members via the interface on the weapon. During an attack from a target, the members can use the touch pads and wearable computers to communicate with one another. As another example, if one of the members is wounded, the member can use the touch pad and wearable computer to transmit a message to the rest of the squad that he or she is injured. As another example, a squad leader or other member may send tactical information to the other members while engaging the target (e.g., a member sees a straight path to a target; therefore the member can use the touch pad to illustrate the path that he or she wants to take to the other members, alerting the other members to the change in tactics).

As another example of an implementation of the user interface system, an industrial worker may have a need for a eyes-free and ears-free method of monitoring various processes while operating a control panel. A control operator may be required to monitor a machine while conducting control actions and inputs. Instead of operating a complex series of possibly unfamiliar controls on the machine, the control operator may use the user interface system described herein, which may be located on or near the machine and is portable. This may allow the operator to move freely for monitoring and servicing the machine. If the control operator finds a problem, the operator may detach the touch pad of the user interface system and carry the touch pad with him or her (e.g., put in a pocket, attach to an arm, etc.) to inspect the problem. While viewing the problem, the operator may use a free hand to operate the touch pad to quickly input a report on the situation, request for help, request a part replacement, etc. The touch pad may be sealed in one embodiment to allow an operator to use the touch pad (e.g., in a manufacturer setting, the operator's hands may be coated with grease or otherwise dirty).

As yet another example of an implementation of the user interface system, a pilot of an aircraft, or a platform driver, or any other user operating a moving object, may use the system. A driver or pilot may have the need to quickly identify controls of the aircraft or vehicle he or she is operating, which may be complex. Further, the pilot or driver may need the ability to enter control, request, and data inputs without looking at the input screen since he or she is driving or flying and needs to retain visual situational monitoring. As a specific example, a pilot may use the user interface system. The touch pad may be located near his or her hand in the center panel of the aircraft. During flight tests, the pilot's eyes may remain fixed on flying the aircraft while he or she uses his or her hand to operate the touch pad and wearable computer. The pilot may use the touch pad to scroll through the various systems of the aircraft, keeping an eye on the gauges as he or she cycles through the systems. The pilot may enter radio selections, route updates and changes, and status requests via the touch pad without looking at the touch pad. In one embodiment, during emergency operations, for example, the pilot could engage systems from a touch pad located with the flight yoke system, retaining full use of the hands for controls but enabling system control. In a situation such as a hijack, the pilot may use slight motions on the touch pad to communicate a need for aid and other information covertly.

As yet another example, a tablet user may view a map display with various dynamically updating information including data and icons. Certain actions such as waypoint creation, exploring a route, or requesting identification of icons may require an input via a structured menu graphical user interface. A touch pad system integrated with a display may be used that enables the user to, for example, tap on an icon to see data. By allowing the user to gesture via the touch pad, the touch input can be applied to the map display without requiring overlaid dialog boxes to be displayed on the screen, retaining the full visual view of the screen during use.

As yet another example, the user interfaces for wearable computers described herein may be used by an underwater diver or water soldier, for example. The user interface may be water-proof and configured to be usable in an underwater setting. The user interfaces for wearable computers may also be used in a space environment and for use by astronauts.

In an alternative embodiment, the user interface may include a see-through display operable via a pointing device function. The touch pad may provide pointing device features for the see-though display in one mode and gesture-based commands (for non-pointing device features) in a second mode. The see-through display may be a display (e.g., display 106) at least partially transparent. The see-through display may allow a user of the user interface to look at the user interface and still be able to see any activity occurring behind the user interface (e.g., if the user wants to look at the user interface but maintain eyesight on a particular area).

In one embodiment, the wearable computer may include a tactile vibration component. The tactile vibration may be user feedback or output that is not audible. The vibration may serve as a indicator to the user of the touch pad and wearable computer (e.g., as a confirmed or denied response to an input provided by the user, as an indication that a status update or other information was confirmed by another user, etc.).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A computerized method for operating a wearable computer using a user interface system having a touch pad, comprising:
   receiving a sensor input, wherein the sensor input relates to at least one of an environment condition, a pulse sensor reading, a motion sensor reading, or a user status;
   determining whether a gesture received at the touch pad makes sense in a current mode;
   determining whether the gesture received at the touch pad makes sense in a second mode, other than the current mode, based on the sensor input; and
   changing the behavior of the wearable computer in response to the gesture received at the touch pad and the sensor input and based on the gesture making sense in the second mode and the gesture not making sense in the current mode, wherein changing the behavior of the wearable computer comprises changing modes from the current mode to the second mode, and wherein the gesture is not used for a graphical user interface operation and is not used for a cursor operation; and
   executing an operation in response to the received gesture, wherein the operation is executed based on not receiving a confirmation from the user for a threshold time period after prompting the user for confirmation and determining that the user is moving during the threshold time period based on the sensor input.

2. The method of claim 1, wherein the changed behavior of the wearable computer is at least one of a navigation behavior and a communications behavior.

3. The method of claim 1, wherein changing the behavior of the wearable computer comprises:
   preparing and sending a wireless message in direct response to a received gesture, without the wireless message having been selected from a visual or audible menu.

4. The method of claim 1, further comprising:
   associating a second gesture with a menu selection; and
   providing an audible menu selection confirmation via an audio output device.

5. The method of claim 1, wherein changing the behavior of the wearable computer comprises associating a received gesture with at least one of wearable computer activities comprising:
   (a) push to talk,
   (b) change network,
   (c) toggle microphone on/off,
   (d) mark navigation waypoint,
   (e) broadcast current position to team or command,
   (f) request instructions to next waypoint,
   (g) request medic, and
   (h) transmit status.

6. A method for operating a wearable computer using a user interface system having a touch pad, comprising:
   receiving signals from the touch pad and recognizing the received touch pad signals as a gesture;
   determining whether the gesture relates to a critical function;
   in response to determining that the gesture does not relate to a critical function, executing an operation relative to an operational menu for the wearable computer in response to the recognized gesture, wherein the executed operation is not a graphical user interface operation and is not a cursor operation;
   in response to determining that the gesture does relate to a critical function, prompting the user for confirmation and waiting to receive confirmation before executing the operation;
   in response to not receiving a confirmation from the user for a threshold time period and determining that the user is running during the threshold time period, executing the operation; and
   outputting feedback in response to the executed operation.

7. The method of claim 6, wherein executing the operation relative to the operational menu for the wearable computer comprises causing the wearable computer to transmit a pre-stored communication message for consumption by another user device on a network.

8. The method of claim 7, wherein the message comprises at least one of:
   (a) hold,
   (b) progress,
   (c) caution,
   (d) target found, and
   (e) come to my location.

9. The method of claim 7, further comprising:
   receiving a pre-stored communication message from another user device on the network; and
   causing the playback of the pre-stored communication message on an audio output device.

10. The method of claim 6, wherein the output feedback is at least one of audio feedback and video feedback.

11. A user interface system for a wearable computer, comprising:

a touch pad comprising a display screen;

a wireless transceiver physically coupled to the touch pad and configured to provide signals from the touch pad to a core of the wearable computer, the core of the wearable computer being worn on a first user body part and the touch pad being worn on a second user body part, the second user body part being a user body part other than the first user body part; and non-transient computer readable media on the touch pad or on the wearable computer, the non-transient computer readable media storing:

(a) a hierarchy of gestures corresponding with a hierarchical menu of options for the wearable computer;

(b) executable computer code for interpreting signals received from the touch pad as input gestures and for causing navigation through the hierarchical menu of options for the wearable computer by comparing the input gestures to the hierarchy of gestures; and (c) executable computer code for executing an operation in response to the input gestures, wherein the operation is executed based on not receiving a confirmation from the user for a threshold time period after prompting the user for confirmation and determining that the user is moving during the threshold time period based on a sensor input.

12. The user interface system of claim 11, wherein the user interface system is not configured to allow cursor-based input to the wearable computer using the touch pad.

13. A user interface device, comprising:

a touch pad comprising a display screen, the touch pad coupled to a rifle stock;

a wireless transceiver coupled to the touch pad and configured to send commands to a controlled device, wherein the controlled device comprises a primary wearable computer core configured to be worn on one of a first user body part, a second user body part, and a third user body part;

circuitry for interpreting touch pad gestures as at least one of communication and navigation commands for the controlled device; and circuitry for executing an operation in response to the touch pad gestures, wherein the operation is executed based on not receiving a confirmation from the user for a threshold time period after prompting the user for confirmation and determining that the user is moving during the threshold time period based on a sensor input;

wherein the commands are not cursor commands or graphical user interface operations.

14. A wearable computer, comprising:

a wearable computer core;

a flexible touch pad comprising a display screen, the touch pad configured to receive touch inputs and gestures for controlling the wearable computer core;

a first coupling mechanism that straps or surrounds a first user body part and the flexible touch pad is configured to be removably coupled to the first coupling mechanism;

a second coupling mechanism that straps or surrounds a second user body part and the flexible touch pad is configured to be removably coupled to the second coupling mechanism; and at least one processor coupled with a non-transitory processor-readable medium storing processor-executable code for causing the at least one processor to execute an operation in response to at least one of a touch input and gesture, wherein the operation is executed based on not receiving a confirmation from the user for a threshold time period after prompting the user for confirmation and determining that the user is moving during the threshold time period based on a sensor input;

wherein the wearable computer core is worn on a fourth user body part, the fourth user body part being a user body part other than the first user body part or the second user body part; and wherein the flexible touch pad is configured to be selectively removed from the first coupling mechanism and coupled to the second coupling mechanism.

15. The wearable computer of claim 14, wherein the first coupling mechanism is an arm band and the second coupling mechanism is a chest harness.

16. The wearable computer of claim 14, further comprising a third coupling mechanism that couples the wearable computer core to a third user body part, the third user body part being a user body part other than the first user body part, the second user body part, or the fourth user body part.

17. The method of claim 1, wherein sensor input indicates a medical issue with the user, and wherein the second mode relates to emergency or medical related commands.

18. The method of claim 1, wherein sensor input indicates a current user environment is outside normal operating parameters, and wherein the second mode relates to a communications behavior relating to the current user environment.

19. The method of claim 6, wherein the critical function comprises at least one of:

(a) commanding movement of other soldiers of a unit, (b) relaying that a user is in position to attack, and (c) commanding an attack.

20. The method of claim 6, further comprising in response to receiving at least one of a negative feedback to the prompt for confirmation and the waiting for confirmation exceeding a predetermined amount of time, ignoring the gesture relating to the critical function.

21. The user interface device of claim 13, wherein the first user body part comprises a torso.

\* \* \* \* \*